Aug. 27, 1968
J. V. LAKE
3,398,481
METHOD AND APPARATUS FOR CONTROLLING CARBON DIOXIDE
CONCENTRATIONS IN GREENHOUSES
Filed May 20, 1966
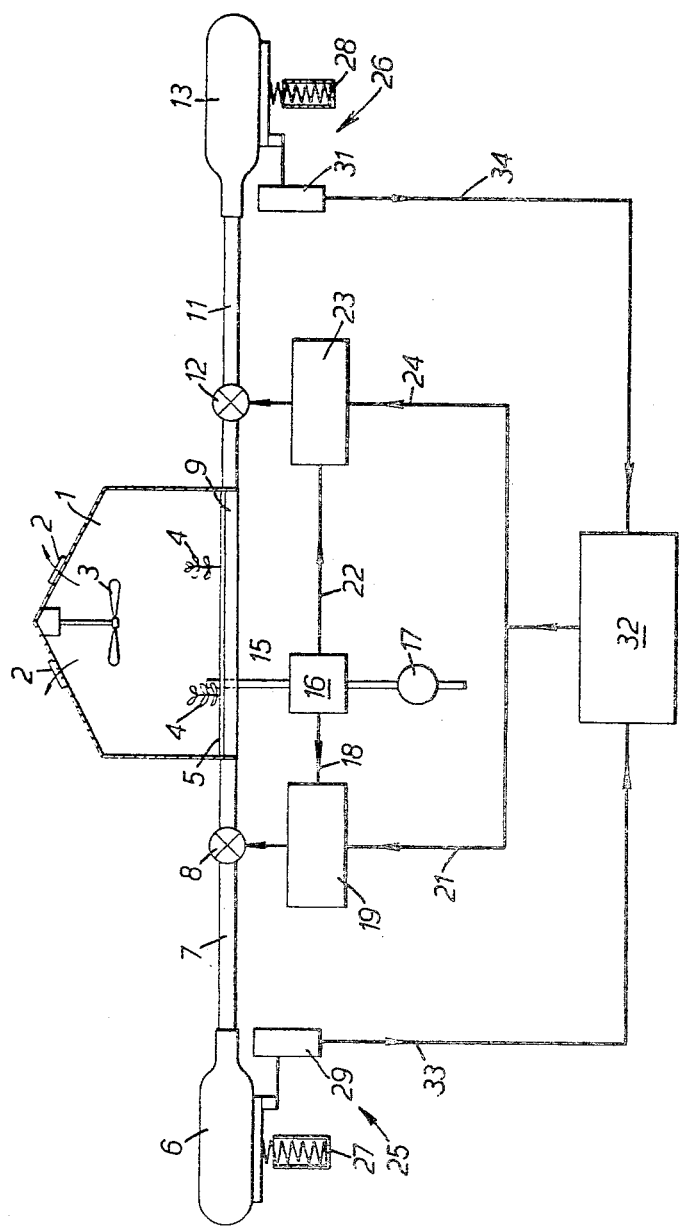
INVENTOR
John V. Lake 3,398,481
METHOD AND APPARATUS FOR CONTROLLING CARBON DIOXIDE CONCENTRATIONS IN GREENHOUSES
John V. Lake, Silsoe, England, assignor to National Research Development Corporation, London, England, a corporation of Great Britain
Filed May 20, 1966, Ser. No. 551,745
Claims priority, application Great Britain, May 20, 1965, 21,434/65
10 Claims. (Cl. 47—58)

ABSTRACT OF THE DISCLOSURE

This application describes a method for controlling the amounts of carbon dioxide in greenhouses, and apparatus to perform the method. The amounts are controlled by (1) measuring $CO_2$ assimilation and (2) measuring $CO_2$ leakage via the use of a passive gas such as nitrous oxide, the latter not being assimilated by plants in the greenhouse.

---

This invention relates to the growing of plants in enclosures such as glasshouses and to the control of the conditions in which the plants grow. It is believed that the best rate of growth is achieved if the rate of assimilation of carbon dioxide by the plants is maintained at a maximum value. The rate of assimilation varies in dependence upon the surrounding conditions including the temperature, the intensity of solar radiation and the carbon dioxide concentration in the atmosphere.

At the present time, assimilation rates are determined experimentally by measuring the dry weight and leaf area of plants sampled from the crop at intervals of the order of ten days. During this time the intensity of the solar radiation reaching the plants fluctuates over the whole range between zero and the maximum value so that a series of different combinations of light intensity and plant temperature occur even if the air temperature and carbon dioxide concentration are successfully held constant. Such experiments are thus difficult to interpret, especially as the rate of carbon dioxide uptake of individual leaves of the plants is not related linearly to light intensity at all levels of carbon dioxide concentration and even when light and all other environmental factors are held constant the rate may vary with time of day. Accordingly such experiments give only very limited indications as to the optimum values of carbon dioxide concentration for given conditions.

Broadly, according to the present invention, a method of controlling the atmosphere in an enclosure in which plants are growing comprises measuring the carbon dioxide concentration of the atmosphere, obtaining an indication of the rate of assimilation of carbon dioxide by the plants at the measured concentration, and adjusting the concentration of carbon dioxide in the atmosphere in a direction to tend to increase the said rate of assimilation. The invention thus applies process control techniques to the growing of plants. It is possible for the control system to operate continuously by functioning in response to changes and rates of change in the various process conditions. For example, the change in the rate of supply of carbon dioxide needed to produce a particular change or rate of change in concentration may be compared with the change in the rate of supply that would be needed in the absence of any change in assimilation rate and this will indicate whether the assimilation rate is increasing or decreasing with the change in concentration. However, control is simplified by comparing successive steady state conditions and thus a preferred way of carrying out the method of the invention comprises maintaining the carbon dioxide concentration of the atmosphere substantially constant over a short set period of time (i.e., of the order of ten to one hundred minutes as distinct from the order of ten days in the experiments referred to above), obtaining an indication of the rate of assimilation of carbon dioxide by the plants during this period, maintaining the concentration at a different value for a further set period, obtaining an indication of the rate of assimilation of the plants during this further period, comparing the two rates of assimilation obtained and adjusting the carbon dioxide concentration in a direction indicated by the comparison to increase the rate of assimilation. This may be performed substantially continuously by comparing rates of assimilation during successive periods and adjusting the concentration to maximise the rate of assimilation. Thus if it is found that by increasing the concentration the rate of assimilation has gone down the concentration will be reduced during the next set period and if this shows that the rate of assimilation has then gone up the concentration will be reduced during the next set period and so on until the rate of assimilation begins to decrease when the concentration will be increased again.

Clearly, the control system is susceptible to many variations. For example, note may be taken of the trends over several successive set periods and the change in concentration may be proportionally or otherwise related to the change in assimilation rate produced by the previous change in concentration.

Similar techniques may be applied to the control of the temperature of the atmosphere in the enclosure and such control may be interleaved with the control of carbon dioxide concentration.

The invention also includes, according to another aspect, apparatus for controlling the atmosphere in an enclosure for growing plants comprising means for supplying $CO_2$ to the enclosure, a control loop comprising a $CO_2$ concentration detecting device, a controlling unit and means for adjusting the rate of supply of carbon dioxide to the enclosure, means for measuring the quantity of carbon dioxide supplied to the plants over successive short periods of time, during which different set values are supplied to the controlling unit, means for comparing the said measurements and means for changing the set value in a direction indicated by the comparison to increase the rate of assimilation.

The net rate of assimilation of carbon dioxide can be determined in various ways. In the simplest form the enclosure is sealed, and, at equilibrium, the total amount of carbon dioxide supplied to the enclosure will be equal to the amount of carbon dioxide absorbed by the plants. Another method which can be adopted is to pass air through the enclosure at a known rate and to determine the concentration of carbon dioxide in the gas entering and the gas leaving the enclosure, for example by means of an infra-red gas analyzer. However, this method is difficult to achieve in practice and the following technique is preferred.

According to this technique the loss of carbon dioxide by leakage from the enclosure is determined by means of a passive gas which is supplied to the enclosure under similar conditions to the carbon dioxide but is not absorbed by the plants. By the term "passive gas" is meant one which is not appreciably absorbed or given off by the plants or other contents of the enclosure or the internal surfaces of the enclosure itself and is generally inert during its passage through the enclosure. In this way the rate of loss of carbon dioxide which will be proportional to the rate of loss of the inert gas can be determined and subtracted from the rate of supply to give the rate of assimilation. A suitable gas to serve as the passive gas in this process is nitrous oxide which conveniently has a density equal to that of carbon dioxide and is not present in atmospheric air. Preferably, the nitrous oxide is supplied to the enclosure to maintain a difference in concentration between the atmosphere in the enclosure and the air outside the enclosure equal to the difference in concentration of the carbon dioxide inside the enclosure and in the outside air. In this way direct correlation of the loss of nitrous oxide and carbon dioxide is achieved. By the use of this technique it is not necessary to seal the enclosure which can therefore be more economically built and adequately ventilated.

The invention also includes apparatus for performing the processes employing the technique of using a passive gas and accordingly apparatus for controlling the atmosphere in an enclosure for growing plants may comprise means for supplying carbon dioxide to the enclosure, a first control loop comprising a carbon dioxide concentration detecting device, a controlling unit and means for adjusting the rate of supply of carbon dioxide to the enclosure, means for supplying a passive gas to the enclosure, a second control loop comprising a passive gas concentration detecting device, a controlling unit and means for adjusting the rate of supply of passive gas to the enclosure, and means for measuring the rates of supply of carbon dioxide and passive gas to the enclosure.

In the discussion of the processes contained in this specification no allowance is made for absorption or generation of carbon dioxide by the soil or other contents of the enclosure other than the plants themselves. In most cases the error introduced by ignoring this factor will be small but if necessary allowance can be made for it.

Possible ways in which nitrous oxide can be used as a passive gas will now be described in somewhat more detail.

Carbon dioxide is injected into a glasshouse from a cylinder provided with continuous weighing means at a rate varied to maintain a constant concentration, $[CO_2]_1$, in the air in the enclosure which is stirred by fans to distribute the gas uniformly. In the course of a time interval $\Delta t$, the loss is weight, $W_c$, of the cylinder of $CO_2$ represents the net amount supplied to the plants and soil, plus that lost by ventilation. To estimate the loss by ventilation, nitrous oxide, $N_2O$, which is absent from the outside air and is not absorbed or produced by plants or soil, is injected into the glasshouse air from a weighed cylinder at a rate varied to maintain a concentration $$[N_2O]_1 = b([CO_2]_1 - [CO_2]_0) \quad (1)$$

where $b$ is a constant and $[CO_2]_0$ is the concentration of $CO_2$ in the air outside the glasshouse. The density, $\rho$, of $N_2O$ happens to equal that of $CO_2$, although the technique does not depend upon this being so. If $\Delta W_N$ is the loss in weight of the cylinder of $N_2O$ during the time interval $\Delta t$, the rate of $CO_2$ uptake by the plants is $$C = S + \frac{1}{\Delta t}\left(\Delta W_c - \Delta\frac{W_N}{b} + V\rho\right)\left(\Delta\frac{[N_2O]}{b} 1 - \Delta[CO_2]_1\right) \quad (2)$$

where S is the rate of $CO_2$ output from the soil and V is the volume of the glasshouse. $\Delta[N_2O]_1$ and $\Delta[CO_2]_1$ represent any small changes in concentration between the beginning and end of the time interval due to imperfections in control system.

In practice $\Delta[N_2O]_1$ and $\Delta[CO_2]_1$ can be kept to negligible amounts and under most weather conditions changes in $[CO_2]_0$ also remain negligible for long periods. If, as suggested above, $b = 1$ and S is negligible the equation given above can be simplified to:

$$C = \frac{\Delta W_c - \Delta W_N}{\Delta t}$$

If $\Delta t$ is of the order of ten minutes the technique provides a means of measuring the rate of carbon dioxide assimilation by all the plants in the enclosure over a short interval of time so that the intensity of solar radiation and the other components of the environment remain nearly constant as will be the case with the relevant physical properties of the plants, such as the leaf area index, stomatal resistance and the diffusion pressure deficit in the tissues and with the chemical properties of the plants, such as the concentration of assimilates accumulated in the leaf tissues.

The invention may be carried into practice in various ways but one form of apparatus and its method of operation in accordance with the invention will now be described by way of example with reference to the accompanying diagrammatic drawing.

The drawing shows a glasshouse 1 having ventilators 2 in the roof and a fan 3 for stirring the atmosphere in the glasshouse. The glasshouse contains growing plants 4. Laid across the bottom of the glasshouse is a tube 5 which is connected to a supply 6 (here represented by a gas cylinder) of carbon dioxide by a line 7 containing an adjustable valve 8. The tube 5 is of thin polyethylene and lies flat except when it is inflated by carbon dioxide through valve 8. The tube has pin holes along its length through which carbon dioxide can pass into the glasshouse. Parallel with the tube 5 is a second thin polyethylene tube 9 also having pin holes along its length and connected by a line 11 containing an adjustable valve 12 to a supply 13 of nitrous oxide.

Positioned within the foliage canopy of one of the plants 4 is an open-ended tube 15 which leads through an infra-red gas analyzer 16 of the Luft type to a pump 17 which draws atmosphere from the glasshouse 1 through the gas analyzer 16. The gas analyzer has means for continuously determining the concentration of carbon dioxide in the gas drawn through it and delivering a measured value signal along a line 18 to an automatic controller 19 having proportional action and controlling the degree of opening of the valve 8 in dependence upon the deviation between the measured value signal in the line 18 and a set value signal in a line 21. The valve 8, the tube 5, the glasshouse 1, the tube 15, the gas analyzer 16 and the automatic controller 19 thus form a closed loop automatic control system for controlling the concentration of carbon dioxide in the atmosphere in the glasshouse. Similarly, the infra-red gas analyzer 16 transmits a measured value signal representing the concentration of nitrous oxide in the atmosphere of the glasshouse along a line 22 to an automatic controller 23 having proportional action and controlling the degree of opening of the valve 12. The automatic controller 23 receives the same set value signal as the automatic controller 19 through a signal line 24.

The cylinders 6 and 13 are mounted on automatic weighing devices 25 and 26 which are represented purely diagrammatically in the drawing as consisting of spring balances 27, 28 controlling potentiometers 29, 31.

The apparatus includes an automatic data logging and computing device 32 which receives measured value signals from the potentiometers 29 and 31 through lines 33 and 34 respectively and supplies the set value signals through the lines 21 and 24.

The apparatus operates as follows. Initially the device 32 supplies a particular set value signal for the concentrations of carbon dioxide and nitrous oxide through lines 21 and 24 to the automatic controllers 19 and 23. At a given instant the device 32 records the weights of the cylinders 6 and 13. The apparatus is run for a period of ten minutes during which time the carbon dioxide control loop and the nitrous oxide control loop will maintain substantially constant and identical concentrations of carbon dioxide and nitrous oxide in the glasshouse 1. Carbon dioxide will be assimilated by the plants but nitrous oxide will not be. Carbon dioxide and nitrous oxide will escape through the ventilators 2 and any other leaks there may be at identical rates. After a set period of, for example, ten or thirty minutes, fresh readings are taken of the weights of the cylinders 6 and 13 and these are subtracted from the corresponding readings taken at the beginning of the set period to give the weights of carbon dioxide and nitrous oxide delivered to the glasshouse during the set period. The second of these figures which represents leakage is subtracted from the first to give the amount of carbon dioxide assimilated by the plants. This figure is stored and the process is repeated for a further set period of time with a higher or lower set value concentration of carbon dioxide and nitrous oxide. The amount of carbon dioxide assimilated in this period is compared with that assimilated in the first period and a new set value is supplied by the device 32 differing from the previous set value in direction (and possibly also amount) indicated by the comparison as likely to improve the rate of assimilation. The process is repeated continuously, the device 32 being programmed to tend always to approach the maximum possible rate of assimilation of carbon dioxide.

Although the operation of the device 32 has been simplified in the example described, it will be apparent that the control could be of a continuous nature rather than of an intermittent nature, the device 32 being sensitive to trends rather than to direct comparisons.

Various other modifications are possible. For example different means may be used for sensing the concentrations of the gases instead of the infra-red gas analyzer 16. Instead of determining the rates of supply of carbon dioxide and nitrous oxide by weighing, flow meters could be employed.

In an area in which there are a number of glasshouses it is not necessary for each glasshouse to have a complete control system such as that described. All that may be necessary is to have a valve controlling the supply of carbon dioxide to each glasshouse, all such valves being slaves to the valve 8. If, however, the rate of leakage from the various glasshouses is not known with sufficient accuracy, it may be necessary to provide individual control loops for carbon dioxide and nitrous oxide for each glasshouse but the weighing devices 25 and 26 and the data logging and computing device 32 for only one glasshouse, set values for the automatic controllers of each glasshouse being delivered by the device 32.

What I claim as my invention and desire to secure by Letters Patent is:

1. A method of controlling the gaseous atmosphere in an enclosure in which plants are growing comprising measuring the carbon dioxide concentration of said gaseous atmosphere, obtaining an indication of the rate of assimilation of carbon dioxide of the plants at said concentration, and adjusting the concentration of carbon dioxide in the gaseous atmosphere in a direction to tend to increase said rate of assimilation.

2. A method as claimed in claim 1 which includes maintaining the carbon dioxide concentration of the said atmosphere substantially constant over a short set period of time, obtaining said indication of the rate of assimilation of carbon dioxide by the plants during this period, maintaining the concentration at a different value for a further set period, obtaining a further indication of the rate of assimilation of the plants during this further period, comparing the two rates of assimilation obtained and adjusting the carbon dioxide concentration in a direction indicated by the comparison to increase the rate of assimilation.

3. A method as claimed in claim 1 in which the rate of loss of carbon dioxide by leakage from said enclosure is determined by supplying a passive gas to the enclosure under similar conditions to the carbon dioxide and determining the rate of supply of the passive gas.

4. A method as claimed in claim 3 in which the passive gas is supplied to the enclosure to maintain a difference in concentration of passive gas between the atmosphere in the enclosure and the air outside the enclosure equal to the difference in concentration of carbon dioxide inside the enclosure and the air outside the enclosure.

5. A method as claimed in claim 3 in which the passive gas is nitrous oxide.

6. Apparatus for controlling the atmosphere in an enclosure for growing plants comprising means for supplying carbon dioxide to the enclosure, a control loop comprising a carbon dioxide concentration detecting device connected to said enclosure, a controlling unit having a set value input signal line and connected to receive a measured value signal from said detecting device and correcting means connected to receive a correction signal from said controlling unit to adjust the rate of supply of carbon dioxide to said enclosure, means for measuring the quantity of carbon dioxide supplied to the plants over successive short periods of time during which different set values are supplied to the controlling unit by said set value signal line, and means for receiving and comparing the said measurements and for changing the set value supplied by said set value signal line in a direction indicated by the comparison to increase the rate of assimilation.

7. Apparatus as claimed in claim 6 which includes means for supplying a passive gas to the enclosure, a second control loop comprising a passive gas concentration detecting device connected to said enclosure, a second controlling unit connected to receive a measured value signal from said passive gas concentration detecting device and correcting means connected to receive a correction signal from said second controlling unit to adjust the rate of supply of passive gas to the enclosure, means for measuring the rate of supply of passive gas to the enclosure and means for subtracting the rate of leakage of carbon dioxide indicated by said measured rate of supply of passive gas to the enclosure from the measured rate of supply of carbon dioxide to the enclosure.

8. A method of measuring the rate of assimilation of carbon dioxide by plants in an enclosure which includes supplying carbon dioxide to the enclosure to maintain a predetermined concentration of carbon dioxide in the enclosure, measuring the amount of carbon dioxide so supplied to obtain a measure of the combined rate of assimilation and leakage from the enclosure of carbon dioxide, supplying a passive gas to the enclosure to maintain a predetermined concentration of passive gas in the enclosure and measuring the amount of passive gas so supplied to obtain a measure of the rate of leakage of passive gas.

9. In a method of controlling the atmosphere in an enclosure in which plants of the kind having foliage are growing wherein carbon dioxide is added to the air in the enclosure, the improvement comprising obtaining an indication of the rate of assimilation of carbon dioxide by the plants at intervals of time not greater than about 100 minutes, comparing successive such indications, and adjusting the concentration of carbon dioxide in said atmosphere in a direction indicated by said comparisons as tending to increase said rate of assimilation.

10. In a method of controlling the atmosphere in an enclosure in which plants of the kind having foliage are growing, wherein carbon dioxide is added to the air in the enclosure, the improvement comprising maintaining the carbon dioxide concentration of said atmosphere substantially constant over a plurality of successive periods of time not greater than about 100 minutes each, obtaining an indication of the rate of assimilation of carbon dioxide by the plants during each said period, comparing the rates of assimilation of successive periods, and adjusting the carbon dioxide concentration of the next succeeding period in a direction indicated by the comparison to increase the rate of assimilation.

References Cited

UNITED STATES PATENTS 2,686,754   8/1954   Monod _____ 47—1.4 X
2,996,429   8/1961   Toulmin _____ 47—1.4 X

OTHER REFERENCES

Algal Culture from Laboratory to Pilot Plant, Burlew, Carnegie Inst. of Washington, publication 600, 1953, pp. 26, 119, 137–8.

Pureco $CO_2$ Carbo-Culture for Greenhouse Growers, received October 1962, 47–17.

ROBERT E. BAGWILL, *Primary Examiner.*